United States Patent [19]
Traub et al.

[11] Patent Number: 5,606,517
[45] Date of Patent: Feb. 25, 1997

[54] VISCOSITY REDUCTION IN PHYSICAL PROCESS SIMULATION

[75] Inventors: Kenneth R. Traub, Watertown; Thomas F. Knight, Jr., Belmont; Kim Molvig, Concord; Christopher M. Teixeira, Cambridge, all of Mass.

[73] Assignee: Exa Corporation, Cambridge, Mass.

[21] Appl. No.: 255,409

[22] Filed: Jun. 8, 1994

[51] Int. Cl.$^6$ .................................................. G06F 19/00
[52] U.S. Cl. ........................ 364/578; 364/509; 364/803; 340/825.79
[58] Field of Search .................................. 364/578, 509, 364/223, 224.7, 232.21, 223.4, 924, 924.3, 924.4, 931, 931.01, 806, 803; 340/825.79; 395/119, 124, 127

[56] References Cited

U.S. PATENT DOCUMENTS

| | | | |
|---|---|---|---|
| 4,809,202 | 2/1989 | Wolfram | 364/578 |
| 4,969,116 | 11/1990 | Wada et al. | 364/578 |
| 4,987,554 | 1/1991 | Kaufman | 395/124 |
| 4,989,166 | 1/1991 | Akasaka et al. | 364/578 |
| 5,255,212 | 10/1993 | Kondoh et al. | 364/578 |
| 5,377,129 | 12/1994 | Molvig et al. | 364/509 |
| 5,408,638 | 4/1995 | Sagawa et al. | 395/500 |
| 5,416,729 | 5/1995 | Leon et al. | 364/578 |
| 5,424,963 | 6/1995 | Turner et al. | 364/578 |
| 5,432,718 | 7/1995 | Molvig et al. | 364/578 |

FOREIGN PATENT DOCUMENTS

| | | |
|---|---|---|
| 0228915 | 7/1987 | European Pat. Off. . |
| WO92/01993 | 2/1992 | WIPO . |

OTHER PUBLICATIONS

Proceedings of the Workshop on Discrete Kinetic Theory, Lattice Gas Dynamics and Foundations of Hydrodynamics, Torino, Italy, Sep. 20–24, 1988.

Wolfram, "Cellular Automation Fluids 1: Basic Theory", J. Stat. Phys., vol. 45, Nos. 3/4, pp. 471–526 (1986).

Vichniac, "Cellular–Automata Fluids", Instabilities and Nonequilibrium Structures II, pp. 97–16 (1989).

Molvig et al., "Removing the Discreteness Artifacts in 3D Lattice–Gas Fluids", Proceedings of the Workshop on Discrete Kinetic Theory, Lattice Gas Dynamics and Foundations of Hydrodynamics (1989).

Molvig et al., "Multi-species Lattice–Gas Automata for Realistic Fluid Dynamics", Springer Proceedings in Physics, vol. 46, pp. 206–231 (1990).

Hasslacher, "Discrete Fluids Part 1: Background for Lattice Gas Automata", Los Alamos Science Special Issue, pp. 175–217 (1987).

Chen et al., "Lattice Boltzmann Model for Simulation of Magnetohydrodynamics", Physical Review Letters, vol. 67, No. 27, pp. 3776–3779, (Dec. 1991).

Qian et al., "Lattice BGK Models for Navier–Stokes Equation", Europhysics Letters, 17(6):479–484 (1992).

d'Humieres et al., "2–D and 3–D Hydrodynamics on Lattice Gases", Fruhjahrstagung der Schweiz. Physikalishen Gesellschaft, vol. 59 (1986).

(List continued on next page.)

*Primary Examiner*—Kevin J. Teska
*Assistant Examiner*—Tyrone V. Walker
*Attorney, Agent, or Firm*—Fish & Richardson P.C.

[57] ABSTRACT

A computer implemented method for simulating a physical process. The method includes storing in a memory a state vector for each of a number of voxels. Each state vector includes a plurality of integers, each of which corresponds to a particular momentum state of a number of possible momentum states at a voxel and represents the number of elements having the particular momentum state. Each integer has more than two possible values. The method also includes performing interaction operations on the state vectors that model interactions between elements of different momentum states, performing viscosity modification operations on the state vectors to change the viscosity of the simulated physical process, and performing move operations on the state vectors that reflect movement of elements to new voxels.

25 Claims, 5 Drawing Sheets

OTHER PUBLICATIONS d'Humieres et al., "Numerical Simulations of Hydrodynamics with Lattice Gas Automata in Two Dimensions", Complex Systems 1:599–632 (1987).

Henon, "Isometric Collision Rules for the Four-Dimensional FCHC Lattice Gas", Complex Systems Publications, Inc., 1:475–494 (1987).

Teixeira, "Continuum Limit of Lattice Gas Fluid Dynamics", B.A. Sc. Engineering Science University of Toronto (1988).

Lim, "Celluar-automation simulation of simple boundary-layer problems", Physical Review A, vol. 40, No. 2, Jul. 1989, pp. 968–980.

Kadanoff et al., "From automata to fluid flow: comparisons of simulation of theory", Physical Review A, vol. 40, No. 8, pp. 4527–4541.

Henon, "Viscosity of a lattice Gas", Complex Systems, 1987, pp. 763–789.

Fahner, "A multispeed model for lattice gas", Complex Systems, vol. 5, No. 1, 1991, Feb. pp. 1–14.

Clavin et al., "Simulation of free boundaries in flow systems by lattice-gas models", Journ. of Fluid Mech, vol. 188, Mar. 1988, pp. 437–464.

D'Humieres et al., "One Dimensional Lattice Gas Models", Comptes Rendus De L'Academiedes Sciences Serie, vol. 308, No. 7, pp. 585–590.

VISCOSITY REDUCTION IN PHYSICAL PROCESS SIMULATION

BACKGROUND OF THE INVENTION

This invention relates to computer systems for simulating physical processes, e.g., fluid flow.

The conventional approach to simulating high Reynolds number flow has been to generate discretized solutions of the Navier-Stokes differential equations, in which high-precision floating point arithmetic operations are performed at each of many discrete spatial locations on variables representing the macroscopic physical quantities (e.g., density, temperature, flow velocity). The fastest and most powerful computers available are used, and yet very limited and inexact results have been achieved. To keep run times manageable, very coarse grid resolutions are used, and even at those coarse resolutions there are unacceptable errors in the solutions due to accumulated round off errors inherent in performing successive floating point arithmetic operations.

There has long been an effort to replace the differential equation approach with what is generally known as lattice gas (or cellular) automata, in which the macroscopic-level simulation provided by solving the Navier-Stokes equations is replaced by a microscopic-level model that performs operations on particles moving between sites on a lattice. The goal has long been to find a microscopic-level model of particle interactions and movement that would produce the correct macroscopic results (i.e., variations in density, temperature, etc. as prescribed by the Navier Stokes equations).

The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

Molvig et al. taught an improved lattice gas technique in which, among other things, many more bits were added to the state vector at each lattice site (e.g., 54 bits for subsonic flow) to provide variation in particle energy and movement direction, and collision rules involving subsets of the full state vector were employed. Molvig et al PCT/US91/04930; Molvig et al., "Removing the Discreteness Artifacts in 3D Lattice-Gas Fluids", Proceedings of the Workshop on Discrete Kinetic Theory, Lattice Gas Dynamics, and Foundations of Hydrodynamics, World Scientific Publishing Co., Pte., Ltd., Singapore (1989); Molvig et al., "Multi-species Lattice-Gas Automata for Realistic Fluid Dynamics", Springer Proceedings in Physics, Vol. 46, Cellular Automata and Modeling of Complex Physical Systems, Springer-Verlag Berlin, Heidelberg (1990) (all hereby incorporated by reference). These improvements and others taught by Molvig et al. produced the first practical lattice-gas computer system. Discreteness artifacts that had made earlier lattice gas models inaccurate at modeling fluid flow were eliminated.

In another approach to avoiding discreteness artifacts, referred to as the lattice-Boltzmann model, the boolean variables of lattice gas techniques are replaced by real variables. Chen et al., "Lattice Boltzmann Model for Simulation of Magnetohydrodynamics," Physical Review letters, Vol. 67, n. 27, 30 Dec. 1991; Qian et al., "Lattice BGK Models for Navier-Stokes Equation," Europhysics Letters, Vol. 17, pp. 479–484, 1 Feb. 1992. Rather than monitoring the presence of individual particles for each state of each site in the lattice, the lattice-Boltzmann model monitors the particle distribution function for each said state.

As described by Qian et al., the real numbers used in the lattice-Boltzmann approach permit application of the method of relaxation, which can be described simply as:

$$N(t+1)=(1-\omega)N(t)+\omega N_e,$$

where $N(t)$ is a quantity at time t, $N_e$ is the quantity's equilibrium (Boltzmann) value, and $\omega$ is a relaxation parameter having a value between 0 and 2. The method is referred to as subrelaxation when $0<\omega<1$, and over-relaxation when $1<\omega<2$. (When $\omega=1$, $N(t+1)$ simply equals $N_e$, and no relaxation occurs.) Qian et al. also noted that the shear viscosity of a simulated fluid can be reduced by increasing $\omega$.

SUMMARY OF THE INVENTION

The invention features modifying the viscosity of a lattice gas system in which each lattice site (voxel) is represented by a state vector that includes an integer value for each state (e.g., in each voxel, 0–255 elements can be moving in a particular direction with a particular energy). Decreasing the viscosity of the system increases the effective density of the lattice and thereby dramatically increases the resolution at which the system is able to simulate a given physical process. Increasing the viscosity of the system permits simulation of high viscosity fluids.

Viscosity is a measure of a fluid's resistance to a shear force (i.e., a force which acts parallel to the direction of fluid flow). In an actual fluid, viscosity results from interactions between neighboring particles in the fluid that cause the velocities of the particles to gravitate toward an average value. In a lattice system, viscosity results from interactions between particles positioned in specific voxels that cause the net velocity of the particles positioned in a voxel to gravitate toward the net velocity of the particles positioned in neighboring voxels. Because each voxel in a lattice system represents a region of simulated space that is substantially larger than the physical space that would be occupied by an actual particle, the viscosity resulting from interactions between voxels is substantially greater than that resulting from molecular particle interactions in real fluids (i.e., the "averaging" resulting from each voxel interaction affects a substantially larger region of space than that resulting from each molecular particle interaction).

Typically, the viscosity of the system is modified using relaxation techniques. Because the relaxation technique described by Qian et al. is directed to a system that uses real numbers, its applicability to an integer-based system is not readily apparent. Indeed, direct application of the relaxation technique described by Qian et al. to a lattice gas system using state vectors comprised of integer values would not work because multiplication of an integer value by the real-valued relaxation parameter would result in a real value rather than an integer value. While the real value produced by the multiplication could be rounded to an integer value, such rounding would result in the system no longer conserving mass, momentum and energy. The invention permits the integer-valued state vectors to be modified by real-valued relaxation parameters, and does so while conserving mass, momentum and energy, and without introducing roundoff error.

Viscosity in a lattice system can be reduced by increasing the density of the lattice (i.e., by decreasing the quantity of simulated space that is represented by each voxel), and can also be reduced through use of over-relaxation. Viscosity, $v$, can be expressed in terms of $\omega$, the relaxation parameter:

$$v = T\left(\frac{1}{\omega} - \frac{1}{2}\right)$$

where T is the temperature of the fluid. Thus, for example, relative to a relaxation parameter of one ($v=T/2$), a relaxation parameter of 1.8 ($v=T/18$) will reduce the viscosity in the lattice by a factor of nine.

The invention promises to substantially improve the ability of lattice systems to simulate physical processes. Because over-relaxation has the same effect as increasing the density of the lattice (i.e., reducing the viscosity of the lattice system), use of over-relaxation effectively increases the density of the lattice. Use of over-relaxation therefore has a dramatic effect on the processing necessary to simulate a physical system with a particular resolution (or the resolution with which a particular processor can simulate a physical system). For example, a tenfold increase in the effective density of a three dimensional lattice reduces the processing required to simulate a physical system with the lattice to a particular level of resolution by a factor of almost ten thousand (i.e., ten cubed less the additional processing required to implement over-relaxation and multiplied by a tenfold decrease in the time required to simulate a fluid of a given velocity).

The invention is implemented in a new computer system for simulating physical processes. Instead of the lattice gas model in which at each lattice site (voxel) there is at most a single element in any momentum state (e.g., at most a single element moving in a particular direction with a particular energy), the invention uses a multi-element technique in which, at each voxel, multiple elements can exist at each of a number of states (e.g., 0–255 elements can be moving in a particular direction). The state vector, instead of being a set of bits, is now a set of integers (e.g., a set of eight bit bytes providing integers in the range of 0 to 255), each of which represents the number of elements in a given state.

To model interactions between elements of different momentum states within a voxel, the computer system performs interaction operations on the state vectors. Typically, these interaction operations are performed for each voxel by applying a set of rules to the state vector of the voxel, where each rule modifies a particular set of integers from the state vector.

To change the viscosity of the simulated physical process, the computer system performs viscosity modification operations on the state vectors. These operations are typically performed after the interaction operations and apply a set of rules that are similar to, or the same as, the rules applied during the interaction operations. Where the same rules are applied, the rules modify the state vectors by a first amount during the interaction operations and a second amount during the viscosity modification operations, where the first amount is related to the second amount by a relaxation parameter. Because the rules used in the interaction operations conserve mass, momentum and energy, this approach ensures that these properties will be conserved during the viscosity modification operations.

When the second amount is determined by multiplying the first amount by a real number derived from the relaxation parameter, the result of the multiplication is truncated to ensure that the second amount is an integer value. To prevent the truncation operation from introducing statistical bias into the system, a random value between zero and one is added to the result of the multiplication prior to truncation.

The viscosity of the lattice system is reduced by using a relaxation parameter having a value greater than one and less than two. As the relaxation parameter approaches two, the viscosity of the simulated system approaches zero and the system becomes unstable. Viscosity, which is essentially a form of friction, tends to damp out fluctuations in the system. Thus, instability occurs when there is no viscosity because these fluctuations are allowed to spread unchecked through the system. It has been found that instability can generally be avoided by using a relaxation parameter that is less than or equal to 1.8.

After performing the interaction and viscosity modification operations, the computer system performs move operations on the state vectors that reflect movement of elements to new voxels.

DESCRIPTION OF THE PREFERRED EMBODIMENTS

Figure 1:
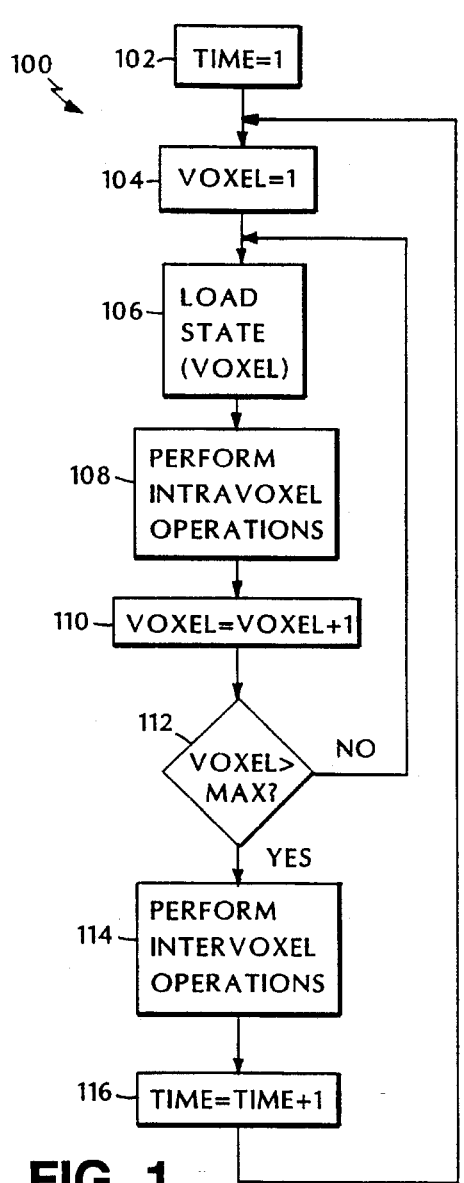
FIG. 1 is a flow chart of a procedure followed by a physical process simulation system.

Referring to FIG. 1, a physical process simulation system operates according to a procedure 100. At startup, a timer is initialized (step 102). Next, a voxel counter, which points to a particular voxel (or location) within the lattice, is initialized to point to the first voxel in the lattice (step 104).

After initialization, the system loads the state vector corresponding to the voxel designated by the voxel count (step 106). The state vector completely defines the status of the voxel, and includes 49 or more multi-bit entries, each of which corresponds to an integer value. These 49 entries correspond to a rest state, 24 directional vectors at a first energy level, and 24 directional vectors at a second energy level. Though only 49 entries are required, preferred embodiments provide for six rest states and therefore use 54 entries. Six rest states are employed to ensure that there are a sufficient number of rest "slots". Of course, this same effect could be achieved by increasing the number of bits in the single entry corresponding to the rest state in a 49 entry embodiment. By using multi-bit entries, the system offers substantially improved performance over systems that used single-bit entries to define voxel status. In particular, unlike single-bit systems that could only produce Fermi-Dirac statistics, which are unsuitable for many applications, the system can produce Maxwell-Boltzmann statistics.

After loading the state vector, the system performs all intravoxel operations on the state vector (step 108). Intravoxel operations are those that do not require information about other voxels. For example, in a fluid simulation system, intravoxel operations would account for collisions between particles within a voxel.

Upon completing the intravoxel operations, the system increments the voxel counter (step 110). If the new voxel count does not exceed the number of voxels in the lattice (step 112), the system loads the state vector of the next voxel (step 106) and continues processing.

If the new voxel count exceeds the number of voxels in the lattice (step 112), the system performs intervoxel operations (step 114). Intervoxel operations are those that require information from more than one voxel. For example, in a fluid simulation system, intervoxel operations would account for movement of particles between voxels. After performing intervoxel operations, the system increments the time (step 116), reinitializes the voxel counter to point to the first voxel (step 104), and continues processing.

Operation of a preferred embodiment of the system is described in detail below. For clarity, the system described above has been described as operating serially. However, as noted below, the system, like other lattice systems, is ideally suited for parallel operations. For example, intravoxel operations could be performed on multiple voxels simultaneously. Similarly, as long as intravoxel operations on all of the voxels involved in an intervoxel operation are complete, the intervoxel operation could be performed simultaneously with other intravoxel operations.

The disclosures of U.S. application Ser. No. 08/030,573, filed Mar. 12, 1993; PCT application Ser. No. PCT/US91/04930, filed Jul. 12, 1991; U.S. application Ser. No. 07/812,881, filed Dec. 20, 1991; U.S. application Ser. No. 07/555,754, filed Jul. 12, 1990; and U.S. application Ser. No. 08/165,293, filed Dec. 10, 1993 are all hereby incorporated by reference.

Before any of the computational operations are described, it is necessary to briefly describe the elementary data structure that comprises the basic state vector for each voxel. This is the basic element upon which the majority of required computations operate. Each lattice site, or voxel (these two terms are used interchangeably throughout this document), contains 54 states for subsonic mono-species simulations. The number of states will be lengthened for transonic flows or multiple-species simulations.

In this document the state space is represented with the following notation:

$$N_i(\underline{x}, t)$$

$N_i$ represents the number of particles in state i, at the lattice site denoted by the 3-dimensional vector $\underline{x}$, at time-step t.

The number of states is determined by the number of possible velocity vectors within each energy level. The velocity vectors consist of integer linear speeds in 4-dimensional space: x, y, z, and w. The 4'th dimension, w, is projected back onto 3-dimensional space and thus does not indicate an actual velocity in the 3-dimensional lattice. For subsonic flows, i ranges from 0 to 53.

Each state represents a different velocity vector at a specific energy level. The velocity of each state is indicated with its "speed" in each of the 4 dimensions as follows:

$$\underline{c}_i = (c_x, c_y, c_z, c_w)$$

The energy level 0 state is known as a stopped particle, they are not moving in any dimension, i.e. $\underline{c}_{stopped} = (0, 0, 0, 0)$. Energy level 1 states have a $\pm 1$ in two of the four dimensions and a 0 velocity in the other two. And energy level 2 states have either a $\pm 1$ in all four dimensions, or a $\pm 2$ in one of the 4 dimensions and a 0 velocity in the other three. Generating all of the possible permutations of these 3 energy levels gives a total of 49 possible states (1 energy 0 state, 24 energy 1 states, 24 energy 2 states). In addition, the subsonic flow state space maintains a total of 6 stopped states as opposed to 1, giving a total state count of 54 instead of 49.

Figure 2:
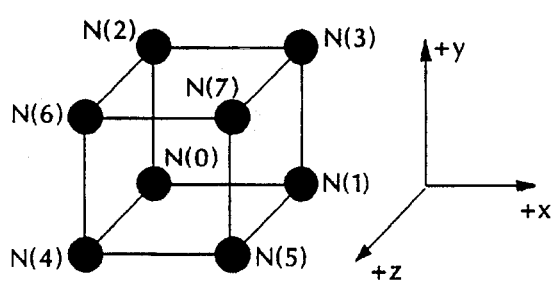
FIG. 2 is a perspective view of a microblock.

The voxels are grouped in to small 2×2×2 volumes that are called microblocks. The microblocks are organized to optimize parallel processing of the lattice sites as well as to minimize the overhead associated with the data structure. A short-hand notation for the 8 lattice sites in the microblock is defined below and is used throughout this document.

$$N_i(x)$$

Where $x \in \{0, 1, 2, \ldots, 7\}$

Where x represents the relative position of the lattice site within the microblock. A microblock is illustrated in FIG. 2.

Microdynamics (Intravoxel Operations)

The microdynamics operations are those set of physical interactions that occur purely within a voxel. This class of operations allows for the permutation of the fluid state space to account for the physical interactions between fluid particles and various types of object surfaces.

Normal Collisions

Normal collisions are operations that allow for particles to collide with each other, thus changing their velocity and direction. A change in a particle's velocity and direction is accomplished by moving that particle into a different state, since it is the state that a particle is in that determines its velocity vector.

The typical collision operation consists of two pairs of input state vectors (4 in total) and likewise two pairs of output state vectors. The basic collision operation collides two "incoming" particles and changes their state into two "outgoing" particles. The incoming and outgoing pairs must always conserve mass, momentum, and energy. Therefore, not all possible quartets within the 54 states are "legal" collision sets.

The basic collision operator is bi-directional in nature, thus the "incoming" and "outgoing" states are determined at the time the collision takes place depending on the local collision states' populations. Two pairs are selected and depending on local density, one pair (incoming) will be the source of particles into the other (outgoing) pair.

The basic collision operation is described below.

$C=\text{SignOf}[(N_i \cdot N_j)-(N_k \cdot N_l)]$ $N\text{Scatt}=C \cdot \delta$ Where $\delta \in \{1,2,4,8\}$ $N_i=N_i-N\text{Scatt}$ $N_j=N_j-N\text{Scatt}$ $N_k=N_k+N\text{Scatt}$ $N_l=N_l+N\text{Scatt}$ Where SignOf is a function that returns only the sign (±1) of the operations enclosed in brackets. The SignOf operator returns a +1 if the value is a 0. The number of particles scattered from states i and j to states k and l, NScatt, is determined by multiplying the sign of the collision operation, C, by a small positive constant δ (delta). The δ is specified along with the state indices in the collision rule list. The pair of states, i and j or k and l, with the larger product becomes the source of the particles to the pair with the lower product. If NScatt is negative, then particles are transferred from states k and l into state i and j.

All 4 of the states represent particles at the same voxel. All of the collisions only depend on the state information local to that particular site. The state indices i, j, k, and l are determined such that a particle from each of states i and j have the same total momentum and energy as a particle from each of states k and l. All 4 of the indices must represent 4 different states and all 4 of the states must be at the same energy level.

As an example of a normal collision, the following initial state is proposed.

$i \rightarrow (1, 0, 1, 0)$    Where $N_i = 25$ $j \rightarrow (1, 0, -1, 0)$    Where $N_j = 40$ $k \rightarrow (1, 0, 0, 1)$    Where $N_k = 30$ $l \rightarrow (1, 0, 0, -1)$    Where $N_l = 50$ $\delta = 4$ As can be seen from the state selection for i, j, k, and l, the pair of i and j have a net momentum of +2 in the x dimension and 0 in y, z, and w. In addition, both particles are at energy level 1. The same is true of the pair k and l. After the first step in the collision process described above, C is equal to −1 (SignOf[(25·40)−(30·50)]=−1). A negative sign indicates that the k and l pair are sourcing particles to the i and j pair.

NScatt is calculated to be −4, based on a delta of 4 that was specified in the collision rule. NScatt is then substracted from states i and j, and added to k and l. The collision operation is now complete and four new output state populations have been created. Where now:

$N_i=29$ $N_j=44$ $N_k=26$ $N_l=46$

By moving the same number of particles out of states k and l and into states i and j, mass is also conserved.

There does exist a potential for overflow and underflow of a state's particle count in the collision operation described above. It should be noted that conservation of mass, momentum, and energy is paramount in this simulation environment and that an overflow of a state would result in a loss of mass, as well as momentum and energy, if it went unchecked. Likewise, it is also possible to have underflow occur, in which case mass would be created, not destroyed. Thus, it is required that the collision operations preserve the mass of the quartet of states that it operates on. This is accomplished by preventing any exchange of particles if the operation would cause either an overflow or underflow in any of the states involved in the collision.

Energy Exchanging Collisions

Energy exchanging collisions are performed just like the normal collisions described in the previous section, except that the two outgoing particles are at different energy levels than the two incoming particles. For subsonic flows there are only 3 energy levels: 0 (stopped), 1, and 2. In order to conserve energy, the only possible energy exchanging collisions occur with one pair consisting of two energy 1 particles while the other pair is comprised of an energy 2 particle and a stopped particle. What makes these collisions special is that these collisions do not happen at the full rate of normal collisions. Therefore, the class of energy exchanging collisions must only be allowed to occur at a specified rate. The rate is specified in two components, a forward and inverse rate. These rates can be specified as integers and implemented in the collision process as follows.

$C = \text{SignOf}[(R_{1 \rightarrow 2} \cdot N_i \cdot N_j) - (R_{2 \rightarrow 1} \cdot N_k \cdot N_l)]$
$N\text{Scatt} = C \cdot \delta$   Where $\delta \in \{1, 2, 4, 8\}$
$N_i = N_i - N\text{Scatt}$
$N_j = N_j - N\text{Scatt}$
$N_k = N_k + N\text{Scatt}$
$N_l = N_l + N\text{Scatt}$ Where are $R_{1 \rightarrow 2}$ and $R_{2 \rightarrow 1}$ are rates that control the exchange of particles between states of different energy levels. The energy exchange collisions are structured such that two energy 1 particles (state i and j) are collided to produce an energy 2 particle and an energy 0 particle (states k and l), or vice versa. As with normal collisions, mass, momentum, and energy are always conserved. The determination of these rates is based on temperature.

The two rates, $R_{1 \rightarrow 2}$ and $R_{2 \rightarrow 1}$, that are used in the energy exchange collisions are calculated based on the temperature of the fluid. The temperature of the fluid, however, is not necessarily constant over the length of a simulation, especially for simulations involving heat transfer. These rates will have to be updated dynamically during the simulation to reflect changes in the local temperature.

The two rates above are not independently calculated. The only relevant information provided by the two rates is in their ratio. The overall Rate is the ratio:

$$\text{Rate} = \frac{R_{2 \rightarrow 1}}{R_{1 \rightarrow 2}}$$

Where the Rate is calculated based from the temperature, T, as described below.

$$\text{Rate} = \frac{((3T-1)(1+3(2T-1)^2))}{(4T(3T-2)^2)}$$

Expanding the product terms out we get the following equation:

$$\text{Rate} = \frac{(36T^3 - 48T^2 + 24T - 4)}{(36T^3 - 48T^2 + 16T)}$$

The temperature range supported for subsonic flows is between 1/3 and 2/3. If the temperature, T, is less than 0.5 the Rate is less than 1 and is greater than 1 for temperatures above 0.5. From this Rate, the two energy rates can then be determined. However, the energy exchange rates have to be scaled within the allowable precision.

The same concerns regarding overflow and underflow conditions also apply to these collision operations. These conditions are possible with energy exchanging collisions and must also be prevented here as well.

Over-relaxation (Viscosity Reduction)

Figure 3:
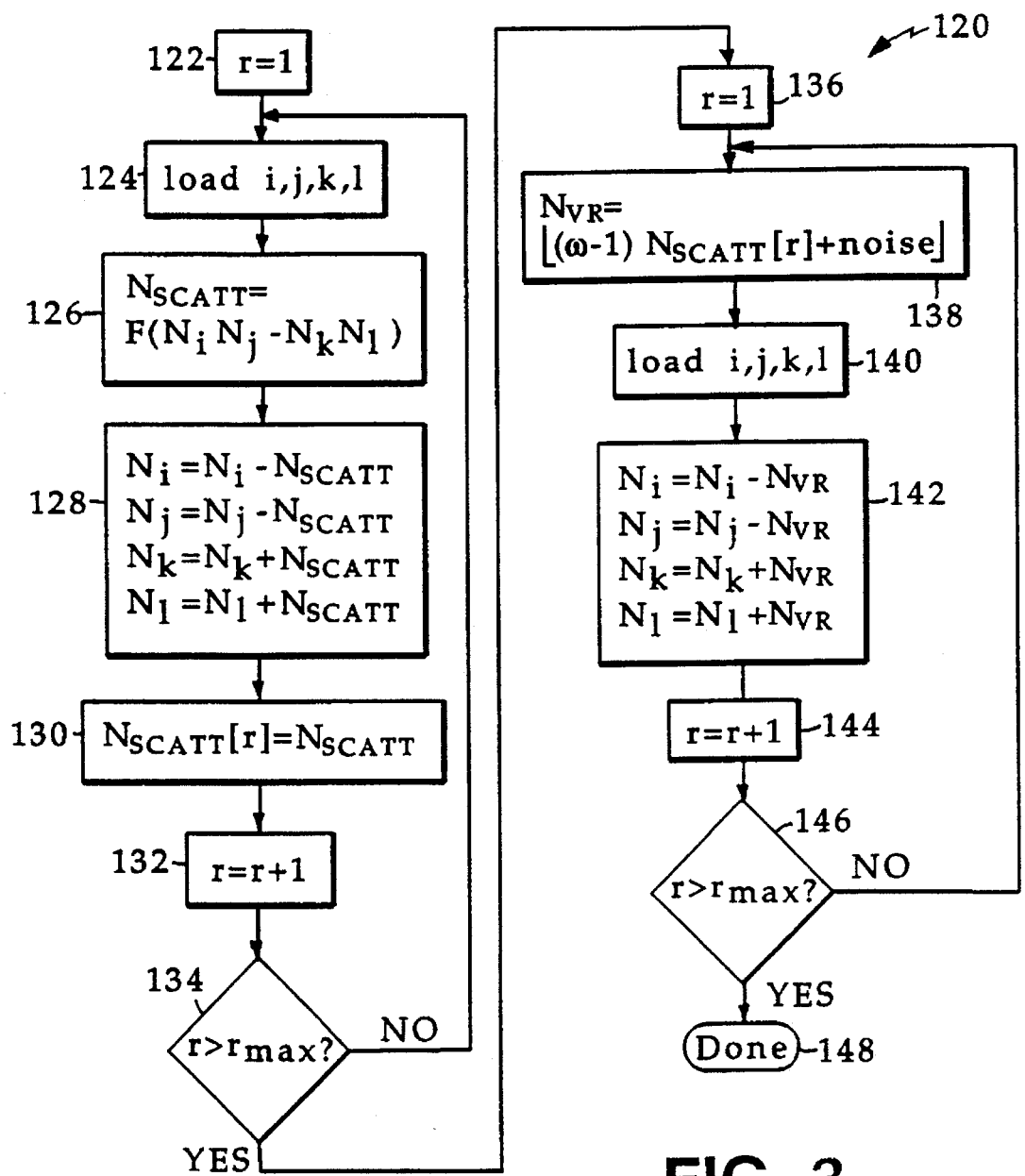
FIG. 3 is a flow chart of a procedure for performing collisions with over-relaxation.

Referring to FIG. 3, the physical process simulation system performs collisions with viscosity reduction for each fluid voxel according to a procedure 120. Procedure 120 includes a collision stage (steps 122–134), in which the system performs normal collision operations for the voxel to place the voxel in the equilibrium (Boltzmann) state, and a viscosity reduction stage (steps 136–148), in which the system performs the viscosity reduction.

At the beginning of the collision stage, the system initializes a rule counter to a value of one (step 122). Next, the system determines which states of the state vector are affected by the rule corresponding to the rule counter, and, assuming that the rule affects four states, loads the identity of those states into variables i, j, k, and l (step 124). (Though the following discussion assumes that each rule affects exactly four states; the system accommodates rules affecting different number of states.) After loading i, j, k, and l, the system determines $N_{Scatt}$, the number of particles scattered, as a function of $N_i$, $N_j$, $N_k$, and $N_l$ using either the normal collision function or the energy exchanging collision function discussed above (step 126). The system then subtracts $N_{Scatt}$ from $N_i$ and $N_j$ and adds $N_{Scatt}$ (or 0 if the original change was omitted to avoid underflow or overflow) to $N_k$ and $N_l$ (step 128). As discussed above, the system does not perform the exchange of particles if the exchange would result in an underflow or overflow condition in any of the affected states. Next, the system stores $N_{Scatt}$ in an array entry ($N_{Scatt}[r]$) corresponding to the value of the rule counter (r) (step 130), and increments the rule counter (step 132). If the incremented rule counter does not exceed the maximum number of rules (step 134), which is 276 in the preferred embodiment, the system loads values into i, j, k, and l based on the rule corresponding to the incremented rule counter (step 124) and continues with the collision stage as described above.

If the incremented rule counter exceeds the maximum number of rules (step 134), the system enters the viscosity reduction stage. First, the system reinitializes the rule counter to a value of one (step 136). Next, the system determines $N_{VR}$, the number of particles scattered due to viscosity reduction, as:

$$N_{VR} = \lfloor (\omega-1)N_{Scatt}[r] + \text{noise} \rfloor$$

where ω is the relaxation parameter, $N_{Scatt}[r]$ is the array entry corresponding to the rule counter, and "noise" is a random value between zero and one (step 138). Use of "noise" ensures that the truncation operation, which forces $N_{VR}$ to be an integer value, will not statistically bias $N_{VR}$ in a particular direction. After determining $N_{VR}$, the system loads the identity of the states affected by the rule corresponding to the rule counter into variables i, j, k, and l (step 140). The system then subtracts $N_{VR}$ from $N_i$ and $N_j$ and adds $N_{Scatt}$ to $N_k$ and $N_l$ (step 142). As noted with respect to the collision operation, the system does not perform the exchange of particles if the exchange would result in an underflow or overflow condition in any of the affected states. Next, the system increments the rule counter (step 144), and, if the incremented rule counter does not exceed the maximum number of rules (step 146), determines $N_{VR}$ for the rule corresponding to the incremented rule counter (step 138) and continues with the viscosity reduction stage as described above. Otherwise, the system ends the collision process (step 148).

Non-Slip Surface Dynamics

All of the collision operations described above are further complicated by boundary conditions. When the surface of an object occupies a voxel, all normal and energy exchange collision operations must be prevented for that specific site. In their place, special types of collision operations must take place. These operations do not collide particles with other particles, they instead collide the incoming particles with the surface of the object. These collisions do not conserve fluid momentum as some of the momentum is imparted to the surface of the object. There are a number of different classes of surface types that define how these boundary collisions occur. The first class, collisions with a non-slip surface, are detailed in this section, other surface classes are described below.

Non-slip surfaces have the property that incoming particles bounce off the surface with the same speed but in the opposite direction from which they came in. This type of non-slip surface collision is also known as "bounce back". The effect of bounce back collisions it to bring the fluid to rest at the surface of the object.

If a voxel is on the surface of a non-slip object then:

$$N_{-i} = N_{-i} + N_i$$

$$N_i = 0$$

Where i is one of the 54 states, and −i indicates the state with equal speed but in the opposite direction of state i. Since the state space of the particle velocities is symmetric, for every state i there exists an equal speed but opposite direction state −i. For example, if the state (1, 0, −1, 0) is i, then the state −i is (−1, 0, 1, 0).

Overflow of the −i state is not possible since after the bounce-back collision is performed the particles at that voxel are then moved according to their new outward direction, this guarantees that these voxels are empty on the next time-step.

Of the 54 states for subsonic flows there are only 46 that are actually moving in 3-dimensional space. This is due to the 6 stopped particles plus the 2 energy level 2 particles that only have a velocity component in the w dimension: (0, 0, 0, 2) and (0, 0, 0, −2). Due to symmetry only half (23) of the moving states can be considered inward states in regards to any surface. The other 23 equal but opposite states are outward directed states. For subsonic flows, the state i is a member of 23 out of the 54 total states, while state −i is a member of a disjoint set of 23 states.

Slip Surface Dynamics

At higher Reynolds numbers, the flow at the surface of an object forms a turbulent boundary layer, which is a thin region of complex flow at the surface of the object. In order to simulate high Reynolds number flows, this layer needs to be resolved completely, However, the resolution requirements to do this literally are astronomical. A slip surface is a technique that is used to represent the outer surface of the boundary layer, which allows the simulation to avoid resolving down into the turbulent boundary layer.

Figure 4:
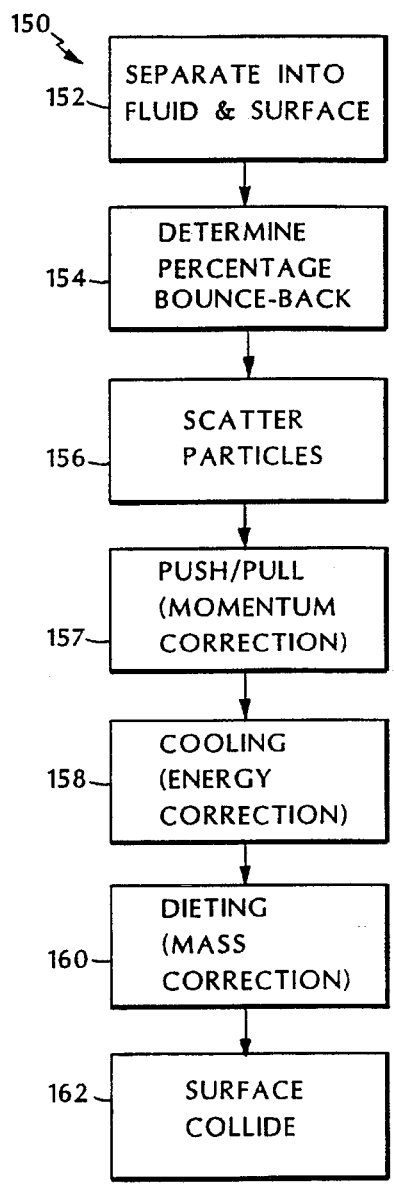
FIG. 4 is a block diagram of a system for performing slip surface dynamics.

Referring to FIG. 4, the microdynamics that apply to a slip surface are applied according to a procedure 150. The steps of procedure 150 are discussed in detail below.

Anti-Aliasing (step 152)

Anti-aliasing is a technique used for slip surfaces to provide greater resolution for surfaces that are not aligned with the lattice. For slip surfaces discretizing the surface in increments of a voxel does not provide enough accuracy for modeling the boundary layer. Anti-aliasing is not required for non-slip surfaces since all of the incoming particles are bounced back in the opposite direction. Particles hitting a slip surface however, reflect off the surface and continue down the surface line. If the surface line is jagged due to discretizing a slope in the surface then tangentially moving particles will bump into these jags.

The anti-aliasing technique is used to essentially allow a voxel to be divided into two parts: part fluid and part surface. The distribution of the anti-aliased voxel into its two parts is determined by the geometry, depending on the percentage of the voxel that is consumed by the object.

The anti-aliasing process temporarily divides the anti-aliased voxels into two separate voxels: a fluid voxel and a surface voxel. The number of particles placed into each of these temporary voxels is based on the percentage of the voxel that is fluid. The calculation is shown below.

$$N_i^{fluid} = \text{Floor}\lfloor((N_i \cdot P_f) + \text{Rand})/P_{scale}\rfloor$$
$$N_i^{surface} = N_i - N_i^{fluid}$$

The fluid percentage, $P_f$, is a real number between 0 and 1 that is scaled to an integer by the factor $P_{scale}$. Rand is a random number between 0 and 1 that is also scaled up by the same $P_{scale}$ factor. This is utilized to recover the precision that is lost when the entire expression is renormalized and rounded towards negative infinity by the Floor operation. The scaling of the factional numbers is required to convert the expression into the integer domain.

For every particle state, i, in an anti-aliased voxel, two separate states are created by the process described above. These two independent states are then treated separately as a fluid and a slip-surface voxel. The fluid portion is then processed as a fluid voxel which undergoes collisions as described previously. The surface portion is processed strictly as a surface voxel as described in the remaining subsections. After all of the microdynamics routines have been applied for the voxel the two independent states are then recombined into one.

$$N_i = N_i^{fluid} + N_i^{surface}$$

Percentage Bounce-Back (step 154)

Slip surfaces also have ability to set the percentage of incoming particles that specularly reflect off of the surface. The incoming particles that are not slipped are bounced back as if the surface were a non-slip surface as described previously. Setting the bounce-back percentage allows the slip-surface to be characterized with a range of skin friction instead of the very low skin friction that 100% slip provides.

The mechanism for bouncing back a percentage of the incoming particles is described in the equations below.

$$N_{bb} = \text{Floor}\lfloor((N_i \cdot P_{bb}) + \text{Rand})/P_{scale}\rfloor$$
$$N_{-i} = N_{-i} + N_{bb}$$
$$N_i = N_i - N_{bb}$$

The bounce-back percentage, $P_{bb}$, is a real number between 0 and 1 that is scaled to an integer by the factor $P_{scale}$. Rand is a random number between 0 and 1 that is also scaled up by the same $P_{scale}$ factor. This is utilized to recover the precision that is lost when the entire expression is renormalized and rounded towards negative infinity by the Floor operation.

$N_{bb}$ is the number of particles from state i that are bounced back into state −i. As described in the non-slip surface microdynamics section, $N_{-i}$, is the bounce-back state population of state i. $N_i$ is the state population of state i, where i is a member of the set of 23 incoming states. The actual set of 23 states is determined by the orientation of the surface normal.

$N_i$ now contains only those particles that are going be specularly reflected off of the slip-surface.

Scattering (step 156)

Figure 5:
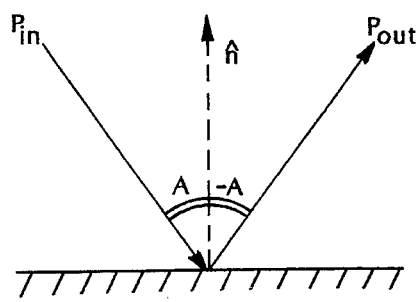
FIG. 5 is an illustration of specular reflection.

Referring to FIG. 5, slip surfaces have the property that particles coming in at an angle A relative to the normal of the surface, bounce off the surface with an outgoing angle of −A relative to the normal (A) of the surface. The goal of the slip surface is to preserve the tangential component of the incoming particles' momentum. The normal momentum of the incoming particles is reversed, i.e. changed by twice the magnitude of their original normal directed momentum. This process is also known as specular reflection.

While the particle state space is discrete, the normal of a given surface needs to vary on a continuous scale. Therefore, there may not be any one state that provides for an outgoing particle at the correct angle relative to the exact normal. For this reason, it is necessary to use a weighted average of multiple outgoing states in order to get the net momentum to be at the correct angle. The current implementation of scattering requires the use of 3 to 6 out-states in order to accurately reflect the incoming particles.

There are 23 incoming states for subsonic flows that need to be scattered into the set 23 outgoing states. For each incoming state, i, the following set of operations must be performed for each outgoing state, j. There are 3 to 6 j's for every one of the 23 incoming states i.

$$\text{Scatt}_j = \text{Floor}\lfloor((N_i \cdot P_j) + \text{Rand})/P_{scale}\rfloor$$
$$N_j = N_j + \text{Scatt}_j \quad N_i = N_i - \text{Scatt}_j$$
$$Exs = Exs + (E_j \cdot \text{Scatt}_j)$$
$$N_{j_{co}} = N_{j_{co}} + \text{Scatt}_j \quad Mxs = Mxs + \text{Scatt}_j$$

Where i is the state of the incoming particles and j is one of the outgoing states that a percentage, $P_j$, of the incoming particles is being scattered into. The scatter percentage is a real number between 0 and 1 (inclusive) that is scaled up by the factor $P_{scale}$. Rand is a random number between 0 and 1 that is also scaled up by the same $P_{scale}$ factor.

Since the count of incoming particles, $N_i$, is decremented with each scattering to one of the output states (as shown in step 2 of the equation above), the percentages applied to the following output states must take this into account. For example, if an incoming states is to be scattered equally into 3 outgoing states, the percentages applied to $N_i$ would not be and 1/3. They instead would be 1/3, 1/2, and 1. In this manner, it is guaranteed that all of the incoming particles are scattered completely.

The last 2 steps of the scattering process described above are not necessarily executed for every output state j. These operations are dependent on the specific scattering rule being executed. The third operation is a means by which the amount of excess energy, Exs, can be accumulated over the scattering process. Many of the scattering rules unfortunately do not conserve energy. The excess energy that is created during the scattering process is accumulated so that it can be corrected at a later point in the slip process. Note that Exs does not contain the subscript j since it is accumulated for the entire voxel.

The last operation of the scattering process provides for the use of a co-state in addition to the normal out-state. In some cases the combination of the out-state and the co-state are required to generate the desired momentum. As described in the equation, the use of a co-state creates an excess of mass since twice as many particles are placed into the out-state and co-state as is subtracted from the in-state. In addition to the increment to the co-state population, an excess mass counter, Mxs, is also incremented by the number of excess particles created. The excess mass that is created as a result of the scattering process is accumulated so that it can be corrected at a later point in the slip process. As with the excess energy count, this value is also accumulated for the entire voxel.

The set of out-states and co-states overlap for the 23 in-states. This occurs since there are a minimum of 3 out-states used to scatter each of the 23 in-states. This opens up the possibility of an overflow occurring in any of the out-states or co-states during the scattering process. If an overflow occurs there are two possible strategies that can be used. First, the microdynamics process for the surface voxel with an overflow condition could be reverted to a non-slip surface. In this case, all of the work done by the scattering process for that time-step needs to be erased. The voxel is then treated as a non-slip surface in which case, all of the incoming particles are bounced back according to the non-slip surface microdynamics. Reverting to bounce-back allows the system to conserve mass and energy, but unfortunately does not preserve the correct momentum that is expected for a slip surface.

A second approach is to clamp the state particle count at its maximum value instead of letting the overflow reset the state count. In this case, the mass, energy, and momentum are not preserved, but the outcome is more closely aligned to the properties of a slip surface than reverting to bounce-back allows.

Pushing/Pulling (step 157)

The next step in the processing sequence for slip surfaces has been termed "pushing and pulling". The scattering process has been carefully constructed so that it preserves the tangential momentum of the incoming particles after they have reflected off of the surface. The scattering process is not, however, guaranteed to generate the correct normal momentum. The pushing and pulling process is used to correct the normal momentum by pushing or pulling the fluid in the normal direction. It pushes the fluid if the normal momentum is less than it should be and pulls if it is more.

This procedure is broken down into two parts. In the first phase the error in the normal momentum must be determined. The second phase is the microdynamics phase in which the fluid is actually pushed or pulled by the amount calculated in part one.

The normal momentum surplus (or deficit) is determined by comparing the normal momentum before scattering is applied versus the normal momentum after scattering. The normal momentum after scattering should be equal but opposite in direction to the before normal momentum. The calculation of the normal surplus, NS, is described below.

$$NS = -((PA_{out}^{after} - PA_{out}^{before}) + PA_{in}^{before})$$

Where PA is the normal directed momentum, and the before and after descriptors denote the normal momentum before and after the scattering process has occurred. The out and in descriptors denote the inward (into the surface) and outward (away from the surface) normal directed momentum. As stated above, the normal surplus is the difference between the before and after momentum. After scattering, however, it is known that all of the inward directed states are empty since they have all been scattered into outward directed states. Therefore, the normal momentum directed inward after scattering is known to be zero and is thus omitted from the equation above. It is also known that the inward and outward normal momentum will be opposite in direction, therefore they will have opposite signs. For this reason, the inward normal momentum is added to the net outward normal momentum to arrive at the difference.

The three components are calculated as described below.

$$Pn_{out}^{before} = \sum_{i}^{outstates} [(N_i \cdot (\underline{c_i} \cdot \hat{n}))]/\hat{n}_{scale}$$

$$Pn_{out}^{after} = \sum_{i}^{outstates} [(N_i \cdot (\underline{c_i} \cdot \hat{n}))]/\hat{n}_{scale}$$

$$Pn_{in}^{before} = \sum_{i}^{instates} [(N_i \cdot (\underline{c_i} \cdot \hat{n}))]/\hat{n}_{scale}$$

Where $(\underline{c_i} \cdot \hat{n}) = (c_{i_x} \cdot \hat{n}_x) + (c_{i_y} \cdot \hat{n}_y) + (c_{i_z} \cdot \hat{n}_z)$ The $\hat{n}$ represents the unit normal vector. Each of its three unit components, $n_x$, $n_y$, and $n_g$, are scaled to an integer by the factor $\hat{n}_{scale}$.

The state velocity vector is represented by $\underline{c_i}$. It has 4 components, one for each of the 4 dimensions of the state space. As noted previously, the lattice gas algorithm restricts particles to only move with integer speeds in each of the lattice directions.

The pushing/pulling process is a fairly complicated sequence of events. The process is set up to incrementally remove the normal surplus calculated above. This goal is accomplished by moving particles from certain out-states to other out-states such that only the normal momentum is affected. The pairings of these out-states is contained in a predetermined list. There are 3 sets of out-state pairing list. Particles must be moved according to the rules among these 3 lists in the correct proportions. The proportions are based on the normal of the surface, $\hat{n}$, which remains constant.

The process is described by the following pseudocode.

1. ns=0
2. $r_1=P_0/2$
3. $r_2=P_0/2$
4. Do pushing/pulling rule from list 0.
5. $r_1=r_1+P_1$
6. If $r_1>P_0$
   a. Do pushing/pulling rule from list 1
   b. $r_1=r_1-P_0$
7. $r_2=r_2+P_2$
8. If $r_2>P_0$
   a. Do pushing/pulling rule from list 2
   b. $r_2=r_2-P_0$
9. ns=ns+1
10. If ns<NS, goto 4

Where a pushing/pulling rule (which is a pairing of two out-states) causes one or more particles to be moved from one of the out-states, a sourcing state, to the other out-state, a destination state. If it is not possible for a rule to fire, due to empty sourcing state or full destination state populations, then another rule from that rule's list is selected. If no rule in the list can be fired then the pushing/pulling process is unable to completely correct the normal momentum. The proportions in which rules in each of the 3 lists are fired is controlled by the predetermined weights of $P_0$, $P_1$, and $P_2$.

The pushing/pulling rules describe state pairings, identifying the sourcing and destination states. If the two states are not at the same energy level, which is frequently the case, then firing the rule not only changes momentum but will also change the energy. Firing a pushing/pulling rule is accomplished by the following process.

$$N_s = N_s - \delta$$

$$N_d = N_d + \delta$$

$$Exs = Exs + (E_R \cdot \delta)$$

Where $\delta$ is a signed integer, which is positive if the process is pushing and negative if the process is pulling. Typically, $\delta$ is a $\pm 1$, however, in cases where the normal surplus, $N_s$, is relatively large it may be increased to correct the normal surplus momentum more quickly. $N_s$ Is the sourcing state population and $N_d$ is the destination state population. $E_R$ is the incremental change in energy caused by a one particle transition from the source state to the destination state for rule number n. The total energy change is accumulated in the same excess energy counter, Exs, that was used in the scattering process. The pushing/pulling rule specifies the states s and d as well as the energy delta $E_R$. If either the two state populations specified, $N_s$ and $N_d$, overflow or underflow then the rule must be prevented in its entirety from firing.

Cooling (step 158)

Cooling is the process in which the excess energy that both the scattering and pushing/pulling processes have created is removed. The cooling process attempts to remove all of the excess energy, Exs, by incrementally firing a number of cooling rules that each decrease the energy level at the voxel. A cooling rule specifies four states, two source states and two destination states. The two source states have the same momentum as the two destination states, but the source states have a combined energy total that is higher than the two destination states. Moving a particle from both of the source states into both of the destination states decreases the energy while conserving mass and momentum in the process. It should be noted here that if the cooling rules are reversed then heating is accomplished.

Firing a cooling rule is accomplished as described below.

$$N_{s1} = N_{s1} - \delta$$

$$N_{s2} = N_{s2} - \delta$$

$$N_{d1} = N_{d1} + \delta$$

$$N_{d2} = N_{d2} + \delta$$

$$Exs = Exs - (\delta \cdot E_R)$$

Where $N_{s1}$ and $N_{s2}$ are the populations of the two sourcing states, and $N_{d1}$ and $N_{d2}$ are the populations of the two destination states. The states s1, s2, d1, and d2 are specified by the cooling rule. The amount of energy removed by a cooling rule is equal to the number of particles, $\delta$, moved from the source states to the destination states multiplied by the energy difference, $E_R$, between the two groups. The energy difference is specified for every rule n. The cooling rules are processed from the cooling rule list until the excess energy, Exs, is removed. If none of the cooling rules provided in the list can be fired then the cooling process is terminated without being able to reach its goal.

None of the four states specified in the cooling rule can be allowed to underflow or overflow their state counts. If any of the four states would overflow or underflow as a result of firing the cooling rule then the rule must not be fired.

Dieting (step 160)

The dieting process is very similar to the cooling process described above. The process attempts to remove the excess mass, Mxs, that was accumulated during the scattering process, by incrementally firing dieting rules that reduce the mass. A dieting rule specifies two source states and one destination state. The two source states have a combined energy and momentum that is the same as the one destination rule. Removing a particle from each of the source states and putting a particle into the one destination state causes the mass of the voxel to be reduced while the energy and momentum are preserved.

Firing a dieting rule is described below.

$$N_{s1} = N_{s1} - \delta$$

$$N_{s2} = N_{s2} - \delta$$

$$N_d = N_d + \delta$$

$$Mxs = Mxs - \delta$$

Where $N_{s1}$ and $N_{s2}$ are the populations of the two sourcing states, and $N_d$ is the populations of the destination state. The states s1, s2, and d are specified by the dieting rule. The amount of mass removed by a dieting rule is equal to the number of particles, $\delta$, moved from the source states to the destination state. The dieting rules are processed from the dieting rule list until the excess mass, Mxs, is removed. If none of the dieting rules can be fired then the dieting process is terminated without being able to reach its goal.

None of the three states specified in the dieting rule can be allowed to underflow or overflow their state counts. If any of these states would overflow or underflow as a result of firing the dieting rule then the rule must not be fired.

Surface Collide (step 162)

The last step in processing surface voxels is to run through a restricted collision rule set. This surface collision process is the same as what was described for fluid voxels. The one exception is that the set of states that it is allowed to collided are restricted to only the out-going states.

Advection (Intervoxel Operations)

In addition to the particle microdynamics, the particles must also move (advect) along the 3-dimensional rectilinear lattice. Each of the separate states represents particles moving along the lattice with integer speeds in each of the 3 dimensions: x, y, and z. The integer speeds include: 0, $\pm 1$, and $\pm 2$. The sign of the speed indicates the direction the particle is moving along that axis. These linear speeds will support particles with energy levels ranging from 0 to 4. Only energy levels 0 to 2 are needed for subsonic flows, while all 5 are needed for transonic flow simulations.

The move operations are computationally quite simple. The entire population of a state must be moved from its current voxel to its destination voxel every time-step. At the same time, the particles at the destination site are moving from their present location to their own destination site. For example, an energy level 1 particle that is moving in the +1x and +1y direction (1,1,0,0), must be moved from its current lattice site to one that is +1 over in the x direction and +1 up in the y direction. The particles end up at their destination lattice site with the same state it had before the move (1,1,0,0). The next phase of microdynamics will likely change the particle count for that state based on local interactions with other particles and surfaces. If not, all the particles will continue to move along the lattice at the same speed and direction.

All of the move operations that are placing particles into a given lattice site must occur before that voxel is collided again. Since all of the microdynamics operations are performed local to one voxel, it is not necessary that all moves be completed before the microdynamics operations can start to be processed.

It should be noted here that the stopped states do not get moved. In addition, the particles only get moved in 3-dimensions. Non-zero values in the w dimension of the state does not affect the lattice site it is to be moved to. For example, an energy level 1 particle with a −1z and a +1w state vector (0,0,−1,1) must be moved as a particle with the same state vector (0,0,−1,1) to a site −1 in the z dimension. There are also 2 energy level 2 states that do not get moved at all: (0,0,0,2) and (0,0,0,−2).

Figure 6:
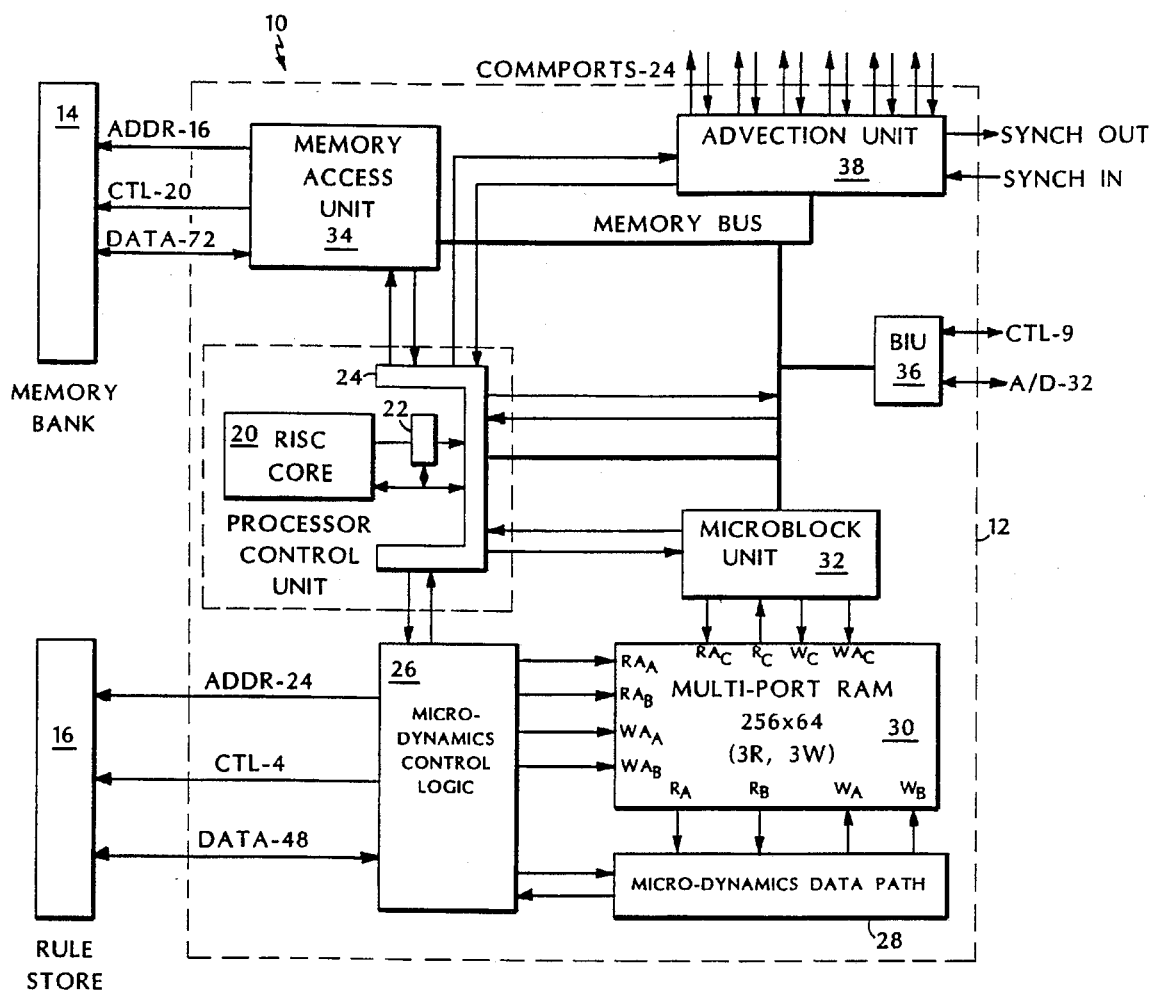
FIG. 6 is a block diagram of a functional unit of a physical process simulation system.

Referring to FIG. 6, the system described above can be implemented using a functional unit 10 that includes an application specific integrated circuit ("ASIC") 12 coupled to a memory bank 14 and a rule store 16. Though a system can be implemented using a single functional unit 10, ASIC 12 is designed so that hundreds, or even thousands, of functional units 10 can be connected together and operated in parallel for improved performance.

ASIC 12 includes a processor control unit ("PCU") 18 that itself includes a reduced instruction set computer ("RISC") processor 20, an instruction cache 22, and RISC interface logic 24. Processor control unit 18 acts as a central controller and issues vector-like commands to the various functional units. The functional units act as co-processors, taking an instruction from the processor control unit 18 and executing their own set of predefined sequences of instructions to complete the task. The instructions for processor control unit 18 are downloaded into memory bank 14 and are executed from there by processor control unit 18. These instructions control processor control unit 18 and cause it to issue commands to the other functional units in ASIC 12.

In addition to storing instructions for PCU 18, memory bank 14 stores particle states for each voxel assigned to the ASIC 12 along with the associated data structure and overhead information. The amount of storage provided by memory bank 14 dictates the amount of resolution that ASIC 12 can be assigned as its part of the total simulation volume. Memory bank 14 is constructed from a set of standard commodity synchronous DRAMs, which have been selected over standard asynchronous DRAMS due to their pipelined access mode and high data bandwidth capabilities.

A microdynamics unit ("MDU"), which includes microdynamics control logic 26 and a microdynamics data path 28, is the functional unit that is responsible for processing the particle dynamics. This includes particle interactions with each other as well as with surfaces. Microdynamics data path 28 includes the hardware necessary to perform the computations on the voxel data. Microdynamics control logic 26 sets up the data path to perform the correct operation and selects the proper data to be processed. Microdynamics control logic 26 sets up the data path and selects the data based on rule sets retrieved from rule store 16. Rule store 16 is constructed out of SRAMs to provide a fast access time and the ability to load the memory as the microdynamics rules are changed.

A multi-port RAM 30 acts as a register file for the particle states and the associated data that the microdynamics data path 28 is currently processing. RAM 30, which is a six-port static RAM, has 256 64-bit entries and supplies two read ports and two write ports to microdynamics data path 28. In addition, RAM 30 provides a read port and a write port to a microblock unit 32. This third set of ports is used for concurrent data movement between RAM 30 and a memory access unit 34 as well as for statistics. Memory access unit 34 is the central source and destination of particle data transfers within ASIC 12, and controls memory bank 14.

Figure 7:
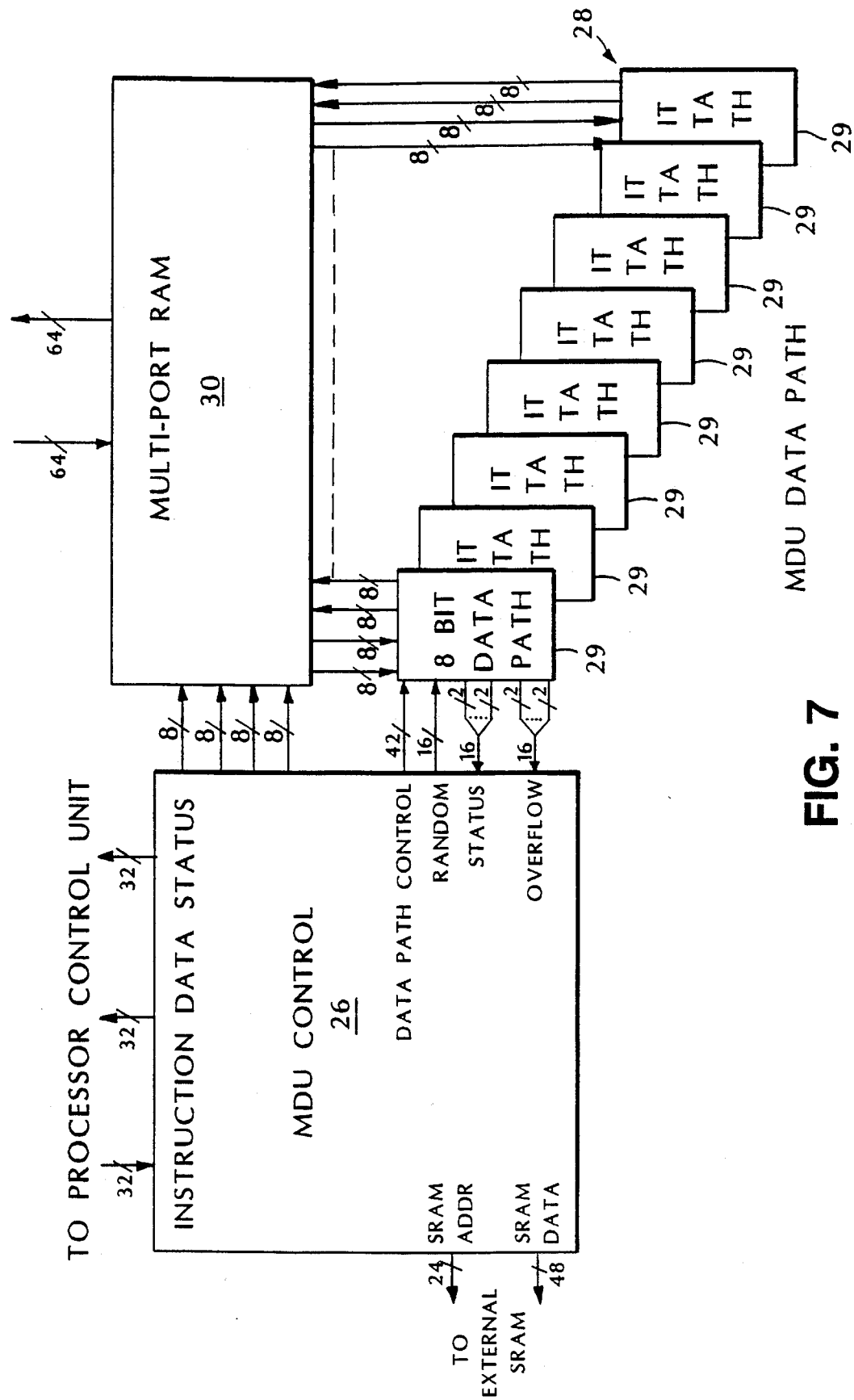
FIG. 7 is a block diagram of a microdynamics unit of the system of FIG. 6.
Figure 8:
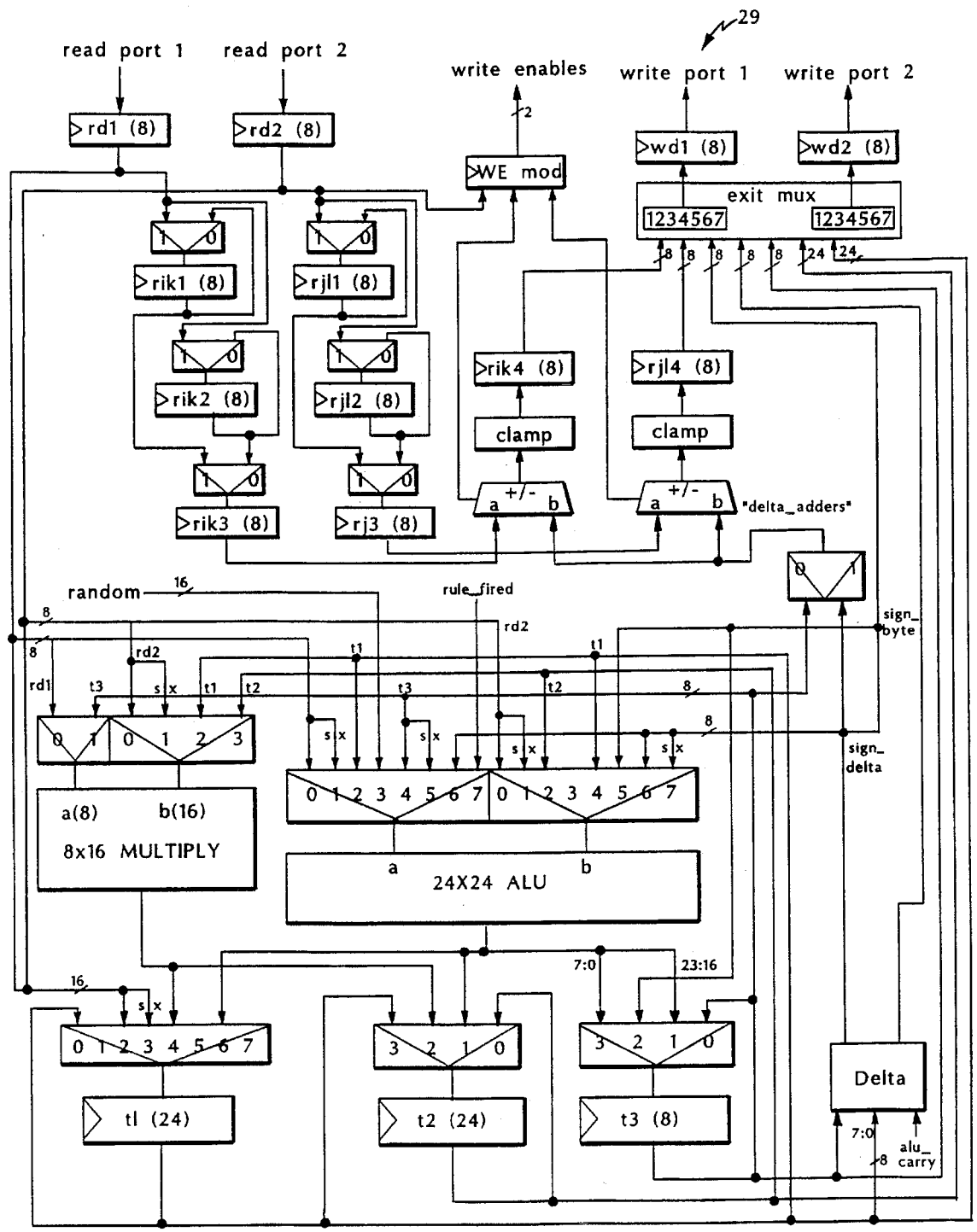
FIG. 8 is a block diagram of a single-voxel data path of the microdynamics unit of FIG. 7.

Referring also to FIGS. 7 and 8, microdynamics data path 28 processes eight voxels in parallel, by providing eight identical copies of the eight-bit data path 29 necessary to process one voxel. Microdynamics control logic 26 is constructed as a SIMD (single instruction multiple data) controller, where all eight sites are set up to execute the same operation on their independent voxel data.

A bus interface unit ("BIU") 36 connects ASIC 12 to external processors such as, for example, a general purpose "host" processor used for system control. The main functions of BIU 36 are to provide a path for the system's host processor to provide initialization information to ASIC 12, and to send statistical information from ASIC 12 to the host processor. In addition, BIU 36 provides a path to memory access unit 34 so that memory bank 14 is accessible to the host processor.

An advection unit ("AU") 38 provides the data path and control to enables particles to advect (move) along the cubic lattice, including support for those particles that are moving to a destination voxel that is owned by another ASIC 12. To transmit particles to a voxel owned by another ASIC 12, AU 38 includes communications ports.

Microblock unit 32 is responsible for calculating statistics on the data being processed in the MDU. After the voxel data has been processed in the MDU, microblock unit 32 uses the voxel data to generate the statistics. The data is then sent back to memory bank 14 through memory access unit 34.

Statistics are the method in which data is extracted from the simulation runs for display and analysis. All of the statistics calculations detailed below are described as to their instantaneous value calculations. However, all of these values can also be accumulated over multiple time-steps. The exact number of time-steps over which they can be accumulated is dependent on the precision to which the values can be maintained.

The system directly supports four types of statistics: state mass, mass, energy, and momentum. As shown below, these statistics are calculated on a microblock basis. It is also possible to accumulate the statistics for larger volumes by adding the statistics for multiple microblocks together. In addition, each statistics operation provides for the ability to collect statistics on less than a microblock by providing a mask. The mask enables or disables statistic accumulation on a voxel by voxel basis within a microblock.

The state mass is the number of particles occupying the specific state within the 2×2×2 array of cells of a microblock. It is determined as follows.

$$D_i = \sum_{x=0}^{7} (N_i(x) \& M(x))$$

Where $N_i(x)$ is the population of sate i at one of the 8 voxels in the microblock whose location is denoted by x. The state mass, $D_i$, is accumulated per state across a microblock M(x) is a mask that if set to a logical "1" enables, via the logical AND operation, voxel x to be accumulated. If M(x) is set to "0" for voxel x then a zero value is accumulated for that voxel.

The mass is different from the state mass in that it accounts for all of the particles in the microblock, not just the particles of a given state. The mass is calculated from the state vectors as described below.

$$N = \sum_{i=0}^{states} \sum_{x=0}^{7} (N_i(x) \& M(x))$$

Where $N_i(x)$ is the population of state i at one of the 8 voxels in the microblock whose location is denoted by x. As can be seen above the mass, N, is the sum of the particles in all states for a given microblock.

The energy of the fluid is determined as one half of the mass times velocity squared. In the lattice gas model, the energy levels are quantized, which is due to the restricted set of discrete velocity states. Each of the separate states falls into one of the discrete energy levels. The energy of a microblock is simply calculated as follows.

$$U_{Tot} = \sum_{i=0}^{states} \sum_{x=0}^{7} ((N_i(x) \cdot E_i) \& M(x))$$

Where $N_i(x)$ is the population of state i at one of the 8 voxels in the microblock whose location is denoted by x. $U_{Tot}$ is the total energy of the specified microblock and $E_i$ is the discrete energy level of state i.

The fluid momentum consists of 4 components, one for each of the 4 dimensions. Momentum is the mass times velocity. The momentum is calculated as described below.

$$P_x = \sum_{i=0}^{states} \sum_{x=0}^{7} ((N_i(x) \cdot c_{x_i}) \& M(x))$$

$$P_y = \sum_{i=0}^{states} \sum_{x=0}^{7} ((N_i(x) \cdot c_{y_i}) \& M(x))$$

$$P_z = \sum_{i=0}^{states} \sum_{x=0}^{7} ((N_i(x) \cdot c_{z_i}) \& M(x))$$

$$P_w = \sum_{i=0}^{states} \sum_{x=0}^{7} ((N_i(x) \cdot c_{w_i}) \& M(x))$$

Alternatively, the equation can be specified in vector notation.

$$\underline{P} = \sum_{i=0}^{states} \sum_{x=0}^{7} ((N_i(x) \cdot \underline{c}_i) \& M(x))$$

Where $N_i(x)$ is the population of state i at one of the 8 voxels in the microblock whose location is denoted by x. The lattice velocity for state i in the x dimension is denoted by $c_{x_i}$. The 4-dimensional velocity vector for state i is denote by $\underline{c}_i$.

Other statistics can be derived from the directly supported statistics, these include velocity, temperature, and force.

The fluid velocity consists of 4 components, one for each of the 4 dimensions. Each component is determined by multiplying the number of particles in a given state by the speed that the state indicates in that dimension and then dividing the sum by the total number or particles. This can also be expressed as diving the momentum by the mass. The 4 components are calculated as follows.

$$u_x = \frac{P_x}{N}$$

$$u_y = \frac{P_y}{N}$$

$$u_z = \frac{P_z}{N}$$

$$u_w = \frac{P_w}{N}$$

Where $u_x$ is the average lattice velocity in the x dimension. The same is also true for $u_y$, $u_z$, and $u_w$, N is the density as described above. The velocity can also be expressed in vector notation as follows.

$$\underline{u} = \frac{\underline{P}}{N}$$

The temperature calculation is one of the more complicated macroscopic data to calculate. The value is calculated from the mass, energy, and velocity values as described above. The temperature calculation is described below.

$$T = \left[ \frac{U_{Tot}}{(2 \cdot N)} - \frac{(u_x^2 + u_y^2 + u_z^2 + u_z^2)}{4} \right]$$

Where $U_{Tot}$ is the energy, N is the mass, and u is the fluid velocity (all are described above).

The force calculation is used to determine the force that the fluid is asserting on the surface of an object. It is determined by subtracting the momentum at the surface boundary after a collision from the momentum that was present before the particle collisions with the surface occurred. The force is also a 4 dimensional vector quantity.

$$F_x = P_x^{Before} - P_x^{After}$$

$$F_y = P_y^{Before} - P_y^{After}$$

$$F_z = P_z^{Before} - P_z^{After}$$

$$F_w = P_w^{Before} - P_w^{After}$$

The calculation is written in vector notation below.

$$\underline{F} = \underline{P}^{Before} - \underline{P}^{After}$$

The before and after momentum vectors, $\underline{P}^{Before}$ and $\underline{P}^{After}$, are calculated as described in momentum section above. The force is measuring the effective momentum that is lost in the fluid due to the fluid collisions with the surface. The momentum calculation described previously is calculated across all of the voxels in a microblock. However, the force is only concerned with those voxels that are on a surface of an object, and all of the voxels in a microblock are not necessarily on a surface. However, for those voxels that are strictly fluid, the collision microdynamics are guaranteed to conserve momentum. Thus including the momentum of fluid cells in the before and after momentum will cancel out to allow the calculation of the correct force. Alternatively, the mask, M(x), can be set to disable any fluid voxels from being accumulated in the momentum calculation.

Referring again to FIG. 6, the programming model for ASIC 12 is a central, RISC processor 20 that issues vector-like instructions to a set of special purpose co-processors contained within ASIC 12. RISC processor 20 has an instruction cache 22 within the PCU 18 that is capable of storing the critical inner control loops for fluids processing. RISC processor 20 has direct access to all data stored in memory bank 14.

The RISC processor 20 is capable of doing the standard set of 32-bit integer arithmetic and logical operations. In effect, the RISC processor can be coded to execute a program in memory as any standard processor could.

A memory map has been established for ASIC 12 that essentially creates three segments in the processor's 4 GB address space.

1.) 2 GB (minus 8 MB) of direct access to the external memory bank controlled by the MAU.

2.) 8 MB of on-ASIC memory mapped registers and instructions owned and decoded by the functional units.

3.) 2 GB of off-chip host memory access connected through the BIU.

The logic in the PCU decodes the address issued by the RISC processor and determines where it should be sent. Local memory requests are sent to the MAU. Memory mapped register reads or writes which includes functional unit instructions are sent to the appropriate functional unit. Host memory references are sent to the BIU which will forward the requests to the host system.

There are four functional units that are capable of requesting memory transfers from the MAU: the Processor Control Unit, the Bus Interface Unit, the Microblock Unit, and the Advection Unit. The MAU arbitrates between the requests from these 4 units and allows single and multiple word transfers. The MAU maintains a DMA engine to support the burst transfers. Upon receiving a grant from the MAU, the unit connects to the MAU and drives or receives data until its transfer is complete.

The RISC processor initiates the transfer of most of the data packets between the various functional units and the Memory Access Unit. The functional units, or co-processors in this model, have no knowledge of system or ASIC level transactions. The units are given data and tasks to perform by the RISC engine and they process that data locally. For example, the processor instructs the Microblock Unit to fetch a specific block of data from the memory controlled by the Memory Access Unit and place it into the Multi-Port RAM. The RISC engine then issues an instruction to the MicroDynamics Unit to process that data. After the processing is complete, the RISC engine instructs the Microblock Unit to retrieve the block of data from the MPR and put it back in a specific location in memory.

In addition to the PCU initiated memory requests, there are 2 off-chip sources of MAU memory transfers: memory requests initiated by the host system via the BIU, and data received from other processors via the AU's communications ports.

The co-processor units are capable of processing routines that take, from tens to hundreds to even thousands of cycles based on a single command from the RISC engine and a block of data held in local storage. This processing length allows the RISC engine enough free time to issue commands and check the status of the other units in addition to possibly doing some calculations itself to update the data structure or determine the segment to process next.

The RISC processor issues instructions to the functional units via memory mapped writes. The address of the write specifies the functional unit along with the opcode of the instruction for that functional unit. The 32-bits of data provided by the write are parameters of the opcode. Each opcode specifies how it interprets the data bus. Each functional unit can only handle one instruction at a time. If a unit is busy processing an instruction previously issued, any new instructions will be pended at the PCU. The RISC processor is also free to read registers and status in each of the functional units to determine the current state of the machine.

To off-load the RISC processor from complicated control loops required to issue memory mapped instructions, an instruction queue is provided in the PCU to queue up a number of instructions. The instruction at the head of the queue is dispatched to the appropriate functional unit as soon as that unit is free to take a new instruction. If the unit is busy, then the queue will not issue the instruction and will stall all subsequent instructions. This queueing mechanism allows the dependencies between the functional units to be encoded in the ordering of the queued instructions. At any time, the processor is free to by-pass the instruction queue and issue instructions directly to and read information from the functional units.

This section provides a first pass overview of how the various functional units are utilized in the processing of voxel data. The inner loop is set up to perform 1 time-step update on a fluid microblock (8 voxels). A time-step update consists of all of the computations necessary to collide, move, and collect statistics for the 8 voxels in a microblock. Subsonic dry air simulations require that a list of 276 collision rules be applied to all of the voxels and that all of the particles be moved to their proper destination sites.

The collision process requires that all 54 states for the microblock be loaded into the Multi-Port RAM before they are processed with the collision rules supplied by the Rules Store. The advection process requires that all of the states get moved in each of the 6 directions (+x, −x, +y, −y, +z, −z).

However, moving a microblock in all 6 directions and then processing the next microblock is very inefficient, since it requires that all of the particles moving out of the microblock be temporarily stored until the data can be loaded into their destination microblocks. A more efficient way of processing advection is to process only particles moving in 1 of the 6 directions at a time on a large number of microblocks before moving particles in another direction on the same group of microblocks.

Other embodiments are within the following claims.

What is claimed is:

1. A computer implemented method for simulating a physical process, comprising the steps of:

(1) storing in a memory state vectors for a plurality of voxels, the state vectors comprising a plurality of integers corresponding to particular momentum states of a plurality of possible momentum states at a voxel, and representing the number of elements having the particular momentum state;

(2) performing interaction operations on the state vectors that model interactions between elements of different momentum states;

(3) performing viscosity modification operations on the state vectors to change the viscosity of the simulated physical process; and (4) performing move operations on the state vectors that reflect movement of elements to new voxels, wherein the interaction operations are performed on the state vector of a voxel before the viscosity modification operations are performed.

2. A computer system for simulating a physical process, comprising:

(1) means for storing in a memory state vectors for a plurality of voxels, the state vectors comprising a plurality of integers corresponding to particular momentum states of a plurality of possible momentum states at a voxel, and representing the number of elements having the particular momentum state;

(2) means for performing interaction operations on the state vectors that model interactions between elements of different momentum states;

(3) means for performing viscosity modification operations on the state vectors to change the viscosity of the simulated physical process; and (4) means for performing move operations on the state vectors that reflect movement of elements to new voxels, wherein the interaction operations are performed on the state vector of a voxel before the viscosity modification operations are performed.

3. The subject matter of claim 1 or 2 wherein the viscosity modification operations change the viscosity of the physical process being simulated according to a relaxation technique.

4. The subject matter of claim 3 wherein both the interaction operations and the viscosity modification operations apply a set of rules to the state vector, and wherein the rules modify particular sets of integers from the state vector.

5. The subject matter of claim 4 wherein the rules are applied during the interaction operations to modify the integers of the state vector by a first amount and during the viscosity modification operations to modify the integers of the state vector by a second amount, and wherein the first and second amounts are related by a relaxation parameter.

6. The subject matter of claim 5 wherein the second amount is determined by multiplying the first amount by a number derived from the relaxation parameter.

7. The subject matter of claim 6 wherein the first amount is determined and stored for a rule during the interaction operations, and wherein the second amount is determined by multiplying the stored first amount by the number derived from the relaxation parameter.

8. The subject matter of claim 6 wherein the second amount is determined by truncating the result of the multiplying step so that the second amount is an integer.

9. The subject matter of claim 8 wherein, before the result of the multiplying step is truncated, a random value is added to the result of the multiplying step.

10. The subject matter of claim 9 wherein the random value is between zero and one.

11. The subject matter of claim 5, wherein the relaxation parameter is greater than 1 and less than 2.

12. The subject matter of claim 11, wherein the relaxation parameter is less than or equal to 1.8.

13. The subject matter of claim 3 wherein the viscosity modification operations reduce the viscosity of the simulated physical process.

14. The subject matter of claim 1 or 2 wherein the elements represent particles capable of movement between voxels, the interactions modeled by the interaction operations are collisions between the particles or between the particles and a boundary surface, and the movement that the move operations reflect is movement of particles between adjacent voxels.

15. The subject matter of claim 14 wherein the value of an integer represents the number of particles at a momentum state at a voxel.

16. The subject matter of claim 15 wherein the interaction operations comprise collision rules that operate on a subset of the integers of a state vector.

17. The subject matter of claim 16 wherein one of the collision rules is a scatter rule that, when the state vector has integers representing a first pair of momentum states at the same voxel will, under certain conditions, transfer a plurality of particles to a second pair of momentum states, such that the first pair has a combined value of one or more physical invariants such as mass, momentum, or energy which is the same as the second pair, and wherein, when the scatter rule transfers particles to the second pair of momentum states, the viscosity modification operations transfer an additional quantity of particles from the first pair of momentum states to the second pair of momentum states, such that the first pair continues to have a combined value of one or more physical invariants such as mass, momentum, or energy which is the same as the second pair.

18. The subject matter of claim 17 wherein the additional quantity of particles transfered by the viscosity modification operations is determined by:

subtracting one from a relaxation parameter; and multiplying the result of the subtracting step by the number of particles transfered by the scatter rule.

19. The subject matter of claim 18 wherein the number of particles transfered by the scatter rule is determined and stored during the interaction operations, and wherein the additional quantity is determined by multiplying the result of the subtracting step by the stored number of particles.

20. The subject matter of claim 18, wherein the additional quantity is determined by truncating the result of the multiplying step so that the additional quantity is an integer.

21. The subject matter of claim 20, wherein, before the result of the multiplying step is truncated, a random value is added to the result of the multiplying step.

22. The subject matter of claim 21, wherein the random value is between zero and one.

23. The subject matter of claim 3 wherein a set of rules is applied during the interaction operations to modify the integers of the state vector by a first amount and during the viscosity modification operations to modify the integers of the state vector by a second amount, and wherein the first and second amounts are related by a relaxation parameter.

24. The subject matter of claim 23 wherein the second amount is determined by multiplying the first amount by a number derived from the relaxation parameter, adding a random value to the result of the multiplication, and truncating the result of the addition so that the second amount is an integer.

25. The subject matter of claim 1 or 2 wherein an integer of a state vector has more than two possible values.

* * * * *

UNITED STATES PATENT AND TRADEMARK OFFICE
CERTIFICATE OF CORRECTION

PATENT NO. : 5,606,517

DATED : February 25, 1997

INVENTOR(S) : Kenneth R. Traub, Thomas F. Knight, Jr., Kim Molvig, and Christopher M. Teixeira It is certified that error appears in the above-identified patent and that said Letters Patent is hereby corrected as shown below:

Cover page, [56] References Cited, OTHER PUBLICATIONS, column 2, the "Vichniac" reference, line 2, "pp. 97-16" should be --pp. 97-116--.

Cover page 2, [56] References Cited, OTHER PUBLICATIONS, column 1, the "Lim" reference, line 1, "Celluar" should be --Cellular-- and "simulation" should be --simulations--.

Cover page 2, [56] References Cited, OTHER PUBLICATIONS, column 2, the "Kadanoff et al." reference, line 2, second occurrence of "of" should be --and--.

Column 7, line 14, "operations" should be --operation--.

Column 7, line 50, "substracted" should be --subtracted--.

Column 12, line 26, "(A)" should be --$\hat{n}$--.

Column 12, line 61, "states" should be --state--.

Column 14, the equation at approximately line 2, each occurrence of "PA" should be --$P\hat{n}$--.

Column 14, line 4, "PA" should be --$P\hat{n}$--.

UNITED STATES PATENT AND TRADEMARK OFFICE
CERTIFICATE OF CORRECTION

PATENT NO. : 5,606,517

DATED : February 25, 1997

Page 2 of 3

INVENTOR(S) : Kenneth R. Traub, Thomas F. Knight, Jr., Kim Molvig, and Christopher M. Teixeira It is certified that error appears in the above-identified patent and that said Letters Patent is hereby corrected as shown below:

Column 14, line 31, "$n_g$" should be --$n_z$--.

Column 14, line 59, "7. $r_2=r_2=P_2$" should be --7. $r_2=r_2+P_2$--.

Column 15, the equation at line 20, "$E_R$" should be --$E_n$--.

Column 15, line 27, "$E_R$" should be --$E_n$--.

Column 15, line 32, "$E_R$" should be --$E_n$--.

Column 15, the equation at line 61 "$E_R$" should be --$E_n$--.

Column 16, line 2, "$E_R$" should be --$E_n$--.

Column 19, line 5, "sate" should be --state--.

Column 19, line 61, "denote" should be --denoted--.

Column 20, line 4, "diving" should be --dividing--.

Column 20, line 18, after "$u_w$", delete "," and insert --.--.

Column 20, the equation at line 30, the first occurrence of "$u_z^2$" should be --$u_x^2$--.

UNITED STATES PATENT AND TRADEMARK OFFICE
CERTIFICATE OF CORRECTION

PATENT NO.   : 5,606,517

DATED        : February 25, 1997

INVENTOR(S)  : Kenneth R. Traub, Thomas F. Knight, Jr., Kim Molvig, and Christopher M. Teixeira It is certified that error appears in the above-identified patent and that said Letters Patent is hereby corrected as shown below:

Column 20, line 55, after "that", insert the following:
--is imparted on the surface of an object by calculating the momentum that--.

Column 24, line 25, "transfered" should be
--transferred--.

Column 24, line 29, "transfered" should be
--transferred--.

Column 24, line 31, "transfered" should be
--transferred--.

Signed and Sealed this

Ninth Day of December, 1997

BRUCE LEHMAN

*Attest:*

*Attesting Officer*  *Commissioner of Patents and Trademarks*